(12) United States Patent
Van Rensburg et al.

(10) Patent No.: US 7,117,014 B1
(45) Date of Patent: Oct. 3, 2006

(54) SYSTEM AND METHOD FOR SELECTING OPTIMIZED BEAM CONFIGURATION

(75) Inventors: Cornelius Van Rensburg, Campbell, CA (US); Piu Bill Wong, Monte Sereno, CA (US)

(73) Assignee: Kathrein-Werke KG, Rosenheim (DE)

( * ) Notice: Subject to any disclaimer, the term of this patent is extended or adjusted under 35 U.S.C. 154(b) by 833 days.

(21) Appl. No.: 09/932,261

(22) Filed: Aug. 17, 2001

(51) Int. Cl.
*H04B 1/38* (2006.01)
*H04M 1/00* (2006.01)

(52) U.S. Cl. .................. 455/561; 455/68; 455/441; 370/334; 342/377

(58) Field of Classification Search .............. 455/12.1, 455/562.1, 574, 129, 167.11, 441, 68, 561; 370/342, 334; 342/377
See application file for complete search history.

(56) References Cited

U.S. PATENT DOCUMENTS

| | | | |
|---|---|---|---|
| 5,924,020 A | * | 7/1999 | Forssen et al. ............. 455/129 |
| 6,108,565 A | | 8/2000 | Scherzer |
| 6,131,049 A | * | 10/2000 | Marsan et al. ............... 455/574 |
| 6,370,357 B1 | * | 4/2002 | Xiao et al. ................. 455/67.11 |
| 6,392,595 B1 | * | 5/2002 | Katz et al. ................... 342/367 |
| 6,597,678 B1 | * | 7/2003 | Kuwahara et al. .......... 370/342 |
| 6,697,644 B1 | * | 2/2004 | Scherzer et al. .......... 455/562.1 |
| 6,895,258 B1 | * | 5/2005 | Scherzer et al. .......... 455/562.1 |

OTHER PUBLICATIONS

U.S. Appl. No. 09/229,482, filed Jan. 13, 1999, Scherzer.
U.S. Appl. No. 09/803,718, filed Mar. 9, 2000, Narasimhan, et al.
U.S. Appl. No. 09/803,356, filed Mar. 9, 2001, Wong et al.

* cited by examiner

Primary Examiner—Steve M. D'Agosta
(74) Attorney, Agent, or Firm—Fulbright & Jaworski LLP

(57) ABSTRACT

Disclosed are systems and methods which provide communication links optimized with respect to particular subscriber units. Preferred embodiments utilize multiple information components with respect to the arrival of signals associated with target subscriber units in providing optimized communication links. Most preferably, direction information and information with respect to the signal spread experienced in the communication channel is used. Moreover, preferred embodiments utilize subscriber unit speed information in providing optimized communication link determinations.

44 Claims, 5 Drawing Sheets

AOA=141, 1MPH

AOA=201, 1MPH

AOA=221, 1MPH

AOA=141, 60MPH

SYSTEM AND METHOD FOR SELECTING OPTIMIZED BEAM CONFIGURATION

CROSS-REFERENCE TO RELATED APPLICATIONS

The present application is related to copending and commonly assigned U.S. patent application Ser. No. 09/229,482 entitled "Practical Space-Time Radio Method for CDMA Communication Capacity Enhancement" filed Jan. 13, 1999, which is a continuation-in-part of U.S. Pat. No. 6,108,565 entitled "Practical Space-Time Radio Method for CDMA Communication Capacity Enhancement," application Ser. No. 09/803,718 entitled "Space-Time and Space-Frequency Hopping for Capacity Enhancement of Mobile Data Systems," filed Mar. 9, 2001, and Ser. No. 09/803,356 entitled "System and Method for Providing Phase Matching with Optimized Beam Widths," filed Mar. 9, 2001, the disclosures of all of which are hereby incorporated herein by reference.

TECHNICAL FIELD

The invention relates generally to wireless communications and, more particularly, to determining optimal beams to minimize transmit power while maintaining a desired signal quality.

BACKGROUND OF THE INVENTION

In wireless communication systems in particular, communication quality and communication capacity often have an inverse relationship. For example, as communication capacity is increased, such as through more dense reuse of traffic channels, signal quality may be decreased, such as through each such traffic channel experiencing higher levels of interference energy. Accordingly, wireless communication service providers must often balance providing desired levels of communication capacity with service quality issues.

In code division multiple access (CDMA) networks, for example, a number of communication signals are allowed to operate over the same frequency band simultaneously. Each subscriber unit is assigned a distinct, pseudo-random, chip code which identifies signals associated with the subscriber unit. The subscriber units use this chip code to pseudo-randomly spread their transmitted signal over the allotted frequency band. Accordingly, signals may be communicated from each such unit over the same frequency band and a receiver may despread a desired signal associated with a particular subscriber unit. However, despreading of the desired subscriber unit's signal results in the receiver not only receiving the energy of this desired signal, but also a portion of the energies of other subscriber units operating over the same frequency band. Accordingly, CDMA networks are interference limited, i.e., the number of subscriber units using the same frequency band, while maintaining an acceptable signal quality, is determined by the total energy level within the frequency band at the receiver.

It is therefore desirable to control the amount of energy radiated within a particular service area to thereby reduce interfering energy experienced by subscriber units operating therein. For example, in the aforementioned CDMA networks, transmitted signals are often power controlled to reduce energy transmitted within the CDMA frequency band while maintaining sufficient power to provide an acceptable signal at a receiving unit. Through intelligent power control, excess energy within the service area may be limited and, therefore, signal quality improved and/or capacity increased.

Further capacity and/or signal quality improvement may be provided in communication systems through the use of directional antenna beams in the communication links, such as may be provided using "smart antenna" systems. Adaptive array antennas may be utilized to provide enhanced signal quality through advanced "beam forming" techniques as shown and described in the above referenced patent application entitled "Practical Space-Time Radio Method for CDMA Communication Capacity Enhancement." For example, angle of arrival (AOA) information determined from a received signal at an adaptive array antenna may be utilized in determining beam forming coefficients for use in providing narrow beams in the reverse link in order to provide improved capacity.

Additionally, direction estimation based on AOA information from the reverse link might be used in providing narrow beams in the forward link. However, the use of such directional antenna beams in the forward link often does not provide the desired containment of the radiated energy and/or does not provide a desired signal quality at a target remote subscriber unit. Generally, the signal of such a narrow antenna beam gets spread over an area different than that of the formed radiation pattern, such as due to the effects of scatters disposed within the radiation pattern area. Accordingly, if a forward link beam is used to simply direct the power in the estimated direction of a target subscriber unit, a significant portion of the transmitted power will not reach the target subscriber unit but will instead be spread across an area wider than that required to maintain the desired communication link. This both results in a waste of the transmitted power as well as increased interference energy experienced at other ones of the subscriber units.

Increased interference energy experienced at the subscriber units results in decreased capacity, whether the decreased capacity is a result of fewer subscriber units being accommodated, the subscriber units being accommodated being provided decreased throughput, or a combination thereof. This undesired result may be further aggravated as a result of the interference energy causing the interfered subscriber units to increase power associated with their communications and, thus, the system experiences a related increase in the associated interference energy.

Moreover, the use of such narrow beams in providing communications links may introduce unique problems associated with their implementation. For example, cellular or personal communication services (PCS) systems using CDMA communication techniques often utilize both a pilot signal and a traffic signal to establish communications. The pilot signal generally provides a known signal and is used by receiving devices in demodulating a traffic signal. In the forward link, i.e., the base station to subscriber unit link, a common pilot signal is often used for multiple subscriber units, such as all subscriber units in a cell or a sector. Accordingly, it is typically desirable to provide this pilot signal throughout an area in which multiple subscriber units are likely to be located.

The use of narrow beams for reducing radiated and/or accepted energy as discussed above can be problematic with respect to use of such a pilot signal. For example, if the pilot signal were to be transmitted in a narrow beam corresponding to the traffic signal of a particular subscriber unit, other ones of the plurality of subscriber units may not receive the pilot signal for use in demodulating their corresponding traffic signal. Accordingly, it is often desirable to provide the pilot signal in an area larger than that of the narrow beam associated with a particular subscriber unit. However, this often results in a phase mismatch problem at one or more of the subscriber units. Specifically, as the link channel associated with the pilot signal (e.g. wide beam) is not the same as that of the link channel associated with the traffic signal (e.g. narrow beam), the phase information extracted from the pilot signal may no longer accurately correlate with the traffic signal as received by a subscriber unit. Although perhaps providing phase matching to within acceptable limits for lower order modulation schemes, such as BPSK, such a phase mismatch is likely to result in unacceptable communication errors, such as an excessive bit error rate (BER), in higher order modulation schemes, such as QPSK, 8PSK, etcetera.

Accordingly, a need exists in the art for systems and methods which provide for the use of optimized beams, such as beams having a minimized or otherwise reduced beam width, to thereby control the amount of interference energy radiated and/or accepted. Moreover, a need exists in the art for the use of such optimized beams to provide a desired and predictable signal phase relationship, such as with respect to a demodulation reference signal.

BRIEF SUMMARY OF THE INVENTION

These and other objects, features and technical advantages are achieved by systems and methods which provide communication links optimized with respect to particular subscriber units. Accordingly, preferred embodiments of the present invention provide efficiency in transmitting power more exactly to target subscriber units with the net effect of using less power to provide communication links of a desired quality. Accordingly, operation of the present invention results in increased capacity such that, with a given amount of total power, more subscriber units are accommodated.

Preferred embodiments of the present invention utilize multiple information components with respect to the arrival of signals associated with target subscriber units in providing optimized communication links. Most preferably, the present invention not only uses direction information, but also uses information with respect to the signal spread experienced in the communication channel, i.e., the scattering zone associated with particular subscriber units.

According to a preferred embodiment of the invention, an Adaptive Array Antenna (AAA), having a plurality of antenna elements disposed in a configuration having predetermined spacing therebetween, is utilized in receiving subscriber unit signals at a Base Transceiver Station (BTS) and estimating the direction of the subscriber units with respect to the BTS. Most preferably, processor systems of the BTS analyze an Array Response Vector (ARV) associated with a subscriber unit's signal as received by the BTS AAA to determine subscriber direction information, such as through Angle of Arrival (AOA) determinations. Additionally, preferred embodiment BTS processor systems analyze an ARV associated with the subscriber unit's signal to determine angle spread information, such as through reference to phase mismatch of a pilot or other reference signal.

Preferred embodiments of the invention utilize an ARV associated with the subscriber unit's signal to determine information with respect to the movement of the subscriber unit, such as determining a subscriber unit's speed through reference to Rayleigh fading information. This movement information may be used according to preferred embodiments of the present invention in selecting an antenna beam for providing a communication link which is optimized with respect to the subscriber unit's movement within a service area. Moreover, this movement information may be utilized according to the present invention in analyzing subscriber unit's ARV information, such as to determine a number of samples which should be analyzed over an integration period.

According to preferred embodiments of the invention, subscriber unit direction information and angle spread information, such as may be estimated using an ARV associated with the subscriber unit as described above, and subscriber unit movement information, such as may be estimated using fading analysis, are used in selecting an optimum beam to provide a desired communication link. For example, subscriber unit direction information and angle spread information, weighted using subscriber unit movement information, may be used with respect to a Look Up Table (LUT), or other database, to select an antenna beam configuration optimized for this particular scenario.

In operation according to preferred embodiments of the invention, selection of optimized antenna beams with respect to a particular subscriber unit results in reduced interference energy in a service area. Accordingly, preferred embodiments of the present invention provides for service of multiple subscriber units within a service area, such as a cell or a sector of a cell, simultaneously. For example, selection of optimized antenna beams may be provided with respect to a plurality of subscriber units determined to be compatible for simultaneous communication, such as through reference to their associated position and speed information. Accordingly, a relatively large number of subscriber units, such as up to 64 mobile units in a cell of a Personal Communication Service (PCS) system, may be served simultaneously where only a relatively small number of such systems traditionally could be served at a particular time, such as one in an omni-directional cell or three in a sectored cell system.

Accordingly, a technical advantage of the present invention is that the use of optimized beams is provided such that the amount of interference energy radiated and/or accepted is controlled. Moreover, a technical advantage of the present invention is that system capacity increases may be accomplished while maintaining a desired signal quality.

A further technical advantage of the present invention is provided by the use of angle spread information in selecting optimized communication links to thereby provide a communication link adapted for use with a scattering zone experienced by a subscriber unit. Moreover, a technical advantage of the present invention is that communication links selected using such angle spread information are adapted to provide phase matching of a reference signal, such as a pilot signal used for signal demodulation.

A still further technical advantage of the present invention is provided by the use of speed or movement information with respect to subscriber units served in selecting optimized communication links to thereby provide a communication link adapted for use with the subscriber unit's movement within a service area. Moreover, a technical advantage of the present invention is that selection of optimized communication links may be simplified and/or made more accurately using such speed or movement information in operating optimization algorithms, such as to determine a number of samples to use in a particular integration period.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION OF THE INVENTION

Figure 1:
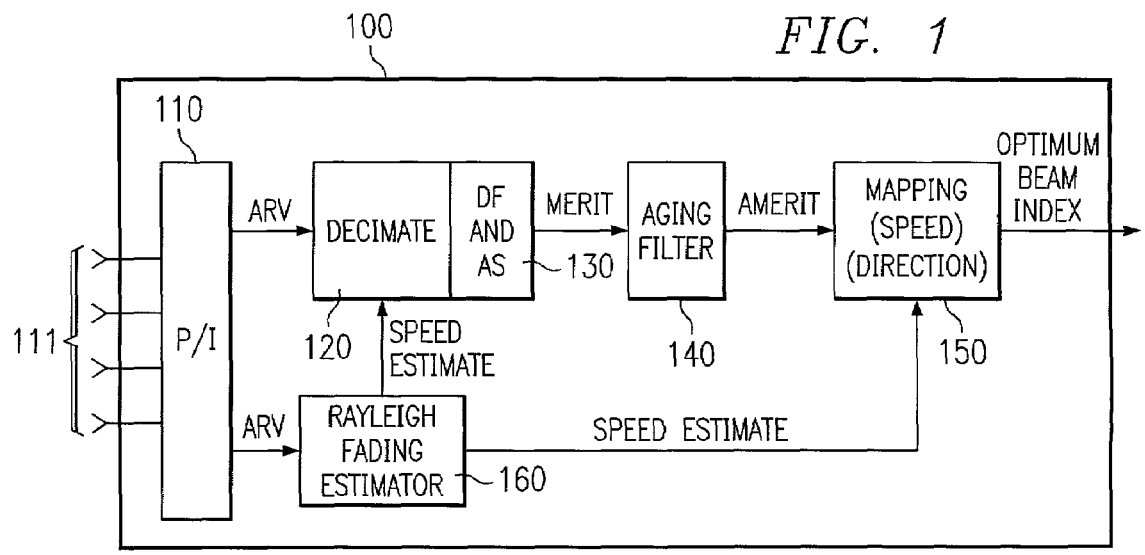
FIG. 1 shows a block diagram of a preferred embodiment beam correlator of the present invention.

Directing attention to FIG. 1, a preferred embodiment beam correlator system of the present invention adapted to determine an optimal antenna beam configuration for use in a communication network, such as a cellular or Personal Communication Services (PCS) system, is shown generally as beam correlator 100. According to a preferred embodiment, an optimal antenna beam determined through use of beam correlator 100 is utilized in providing a forward link that results in a least transmit power required to maintain a desired signal quality, such as by maintaining a desired Frame Error Rate (FER). Of course, alternative embodiments of the invention may utilize beam correlator 100 differently, such as for determining reverse link beam configurations, and/or may utilized different metrics than those shown, such as maintaining a desired Bit Error Rate (BER), Receive Signal Strength Indicator (RSSI), Carrier to Interference (C/I) ratio, etcetera.

Preferred embodiment beam correlator 100 of FIG. 1 may be coupled to circuitry and systems (not shown) of a Base Transceiver Station (BTS), such as a BTS of a cellular or PCS system as are well known in the art. Accordingly, the BTS may provide communications within a particular portion (cell) of a service area (cellular network). Moreover, the particular portion (cell) of the service area may be divided into regions (sectors) as is common among such systems. Accordingly, the BTS may include additional circuitry (not shown) associated with additional regions, such as providing beam correlator circuitry as shown in FIG. 1 for each such region.

Preferably, beam correlator 100 is coupled to an Adaptive Antenna Array (AAA) to thereby provide a "smart antenna" BTS configuration. According to a preferred embodiment, beam correlator 100 is coupled to a relatively small aperture antenna array, such as a configuration of phased array antenna panels where each antenna panel includes 4 columns of antenna elements placed a predetermined fraction of a signal wavelength apart for use in beam forming signals. A plurality of such phased array antenna panels may be oriented to provide communication throughout a particular portion of a service area, such as a cell. For example, three such phased array antenna panels, e.g., one for each of 3 sectors, may be disposed to provide 360° illumination of a cell.

According to one embodiment of the present invention, the BTS to which beam correlator 100 is coupled operates to provide wireless communication services according to CDMA-2000 protocols. According to the CDMA-2000 (1xRTT) protocol, each subscriber unit transmits a traffic signal and a unique pilot signal associated therewith to the BTS (reverse link). However, the BTS transmits a traffic signal unique to each subscriber unit and a common pilot corresponding to a plurality of such traffic signals (forward link). Accordingly, it is typically desirable for base station 100 to provide the common pilot signal throughout an area in which multiple subscriber units might operate, such as throughout a cell or a sector of a cell.

It should be appreciated that, although operation according to CDMA-2000 protocols is discussed herein, there is no limitation to the present invention operating with such protocols, nor even to operating with CDMA access schemes in general. As will be readily understood by one of ordinary skill in the art, the concepts of the present invention are applicable to any number of communication protocols. However, the preferred embodiment implementation of the present invention is particularly applicable to particular communication protocols, such as the aforementioned CDMA-2000 protocols, where a pilot signal is used with respect to traffic signals. One of skill in the art will recognize that the preferred embodiment implementation described herein may be adapted easily for WCDMA systems, where a reverse link pilot also exists. Moreover with only minor modifications to the preferred embodiment described herein, a beam correlator of the present invention may be used with air link protocols, such as IS-95, where no reverse link pilot exists. For example, a Walsh signal may be delayed and demodulated to provide an array response vector as described herein.

Connectors 111 of the preferred embodiment couple beam correlator 100 to a BTS antenna system (not shown) disposed to provide wireless communication in an area associated with a plurality of subscriber units. For example, the illustrated embodiment provides 4 connectors such as may be coupled to a phased array antenna panel having 4 columns of antenna elements, such as provided by an antenna configuration as described above. It should be appreciated that the use of 4 antenna element columns is not required according to the present invention and, therefore, other numbers of antenna element columns and/or elements may be utilized, if desired. However, it should be appreciated that the preferred embodiment of the present invention utilizes techniques, more fully described below, to optimize antenna beam configurations without requiring a large aperture antenna array to provide high resolution direction finding. Specifically, preferred embodiments of the present invention utilize direction and angle spread information, as may be determined using a narrow aperture antenna array, in providing optimized antenna beam configurations.

Connectors 111 of the illustrated embodiment are each individually coupled to pilot integrator 110, such as may include receiver circuitry to down convert the received signals to a base band for processing according to the present invention. Pilot integrator 110 of the illustrated embodiment is coupled to Rayleigh fading estimator circuitry 160 which is coupled to decimator circuitry 120 and to beam mapping circuitry 150. Pilot integrator 110 of the illustrated embodiment is also coupled to decimator circuitry 120 which is coupled to direction finding and angle spread estimator circuitry 130 in the illustrated embodiment. Direction finding and angle spread estimator circuitry 130 of the illustrated embodiment is coupled to aging filter 140 which is coupled to beam mapping circuitry 150. Beam mapping circuitry 150 preferably outputs information with respect to an optimum antenna beam for use in a forward link as a function of subscriber unit direction with respect to the BTS, angle spread associated with the subscriber unit, and speed at which the subscriber unit is moving.

In operation according to the illustrated embodiment, a subscriber unit (not shown) communicates with the BTS using both a pilot signal and a traffic signal, where the pilot signal is utilized in demodulating the traffic signal. These signals as received by the antenna columns are provided to pilot integrator 110 where a pilot signal is used to estimate the ARV associated with a corresponding subscriber unit. For example, the ARV of each mobile station may be measured by integrating its reverse link dedicated pilot for a specific integration interval, which can vary from a fraction of a millisecond to a few tens of milliseconds. Accordingly, an ARV for each subscriber unit, representing the path a signal followed to reach the array from a particular subscriber unit, may be provided by pilot integrator 110 after each integration period, e.g., an ARV from every fraction of a millisecond to every few tens of milliseconds.

The preferred embodiment of the present invention utilizes the ARV for each subscriber unit in determining an optimum beam for use therewith in the forward link by determining subscriber unit direction and speed information as well as angle spread associated therewith. Accordingly, pilot integrator 110 preferably provides the ARV for each such subscriber unit to Rayleigh fading estimator circuitry 160 and to decimator circuitry 120.

Rayleigh fading estimator circuitry 160 of the preferred embodiment is utilized in estimating the speed of subscriber units. It should be appreciated that in operation according to preferred embodiments of the present invention the speed at which a subscriber unit's position is changing is an important parameter in choosing an optimum beam as different speeds will result in behavior differences which may be accommodated by particular beam configurations. Simulations have shown that the choice of an optimal beam may change as the speed of a subscriber unit changes. For example, for fast moving subscriber units a narrower beam may provide an optimal beam and, conversely, a wider beam may provide an optimal beam for slower moving subscriber units given a particular scattering zone. This difference in optimal beams associated with subscriber unit speed may be attributed to the deinterleaver and decoders in the receivers of some cellular system configurations performing differently (non-linearly) to varying degrees of phase mismatch and signal strength.

Moreover, once subscriber unit speed information is available, a determination may be made as to how redundant the available information is, e.g., how similar a subscriber unit's ARVs are expected to be over a period of time. For example, if the subscriber unit is moving very slowly, it would be expected that the corresponding ARVs for a period of time would not change much. The speed of the subscriber unit's movement may be relied upon to indicate how well the instantaneous ARV represents the average ARV. The faster the subscriber unit moves, the more uncorrelated the ARVs are and thus the shorter the integration time required to provide uplink ARV statistics which relatively accurately represent the downlink ARV statistics. Accordingly, Rayleigh fading estimator circuitry 160 may provide information with respect to a subscriber unit's speed to decimator circuitry 120 to cause an amount of ARV data corresponding to the subscriber unit's speed to be provided for further processing according to the present invention.

For example, at low speeds, as may be indicated by Rayleigh fading estimator circuitry 160, a reduced portion of the ARVs collected over a period of time, such as ⅛ of the ARV data collected, may be provided by decimator circuitry 120 to direction finding and angle spread circuitry 130 for further processing according to the present invention. This reduced amount of data provided for further processing may be utilized to avoid calculations based upon substantially redundant data and/or to increase the time period over which optimum beam determinations are made (it being appreciated that if a subscriber unit is moving slowly optimized beam selections may be updated more slowly). Specifically, decimation may be used at low speeds to de-correlate the ARV samples. However, if the subscriber unit is moving very fast, as may be indicated by Rayleigh fading estimator circuitry 160, all or substantially all the ARVs collected over a period of time may be provided by decimator circuitry 120 to direction finding and angle spread circuitry 130 for further processing according to the present invention. This more complete amount of data may be utilized to provide optimized beam updates continuously and very quickly in response to the rapid movement of the subscriber unit.

It should be appreciated that the decimator circuitry of the preferred embodiment provides a sub-sampling rate with respect to the ARVs. For example, ARVs corresponding to a particular subscriber unit may be provided by pilot integrator circuitry 110 at a relatively constant rate. Decimator circuitry 120 may allow a fraction of these ARVs for any period of time to pass to direction finding and angle spread circuitry 130. For example, 1 in every 12 ARVs may be allowed to pass by decimator circuitry 120 when the subscriber unit's speed is estimated to be a particular, relatively low, speed. However, 1 in every 10 ARVs may be allowed to pass by decimator circuitry 120 when the subscriber unit's speed is estimated to be another particular, somewhat higher, speed. When the subscriber unit's speed is estimated to reach a, relatively high, threshold speed, decimator circuitry 120 may no longer decimate the ARV information and, instead, allow all ARVs to pass.

A Look Up Table (LUT) providing preferred embodiment decimation rates corresponding to subscriber unit estimated speeds for use in a PCS system according to the present invention is shown below.

| Speed (mph) | Decimation Rate |
|---|---|
| 1–10 | ⅛ |
| 10–30 | ¼ |
| 30–50 | ½ |
| >50 | 1/1 |

It should be appreciated that the amount of decimation provided by decimator circuitry 120 is not limited to any particular increments, whether factors of 10, 5, or any other number. Accordingly, decimator circuitry 120 of the preferred embodiment may provide any level of decimation desired with respect to the ARV information.

In operation according to the preferred embodiment the decimated or sub-sampled ARV data is provided to direction finding and angle spread circuitry 130 such that, for every ARV provided to direction finding and angle spread circuitry 130, an angle spread and direction estimation is made as a beam merit value. Preferably, the angle spread and direction estimation for the decimated ARV data is provided to an aging filter, such as aging filter 140, to thereby average these estimates over a period of time. According to a preferred embodiment, at least 512 ARV samples are analyzed to provide a consistent beam merit estimate. In a preferred embodiment where approximately 800 ARV samples per second are provided (a sampling rate of 800 ms), direction finding and angle spread estimation would represent from approximately 0.5 to approximately 5 seconds processing time, depending upon the level of decimation implemented.

It should be appreciated that, having direction information and angle spread information with respect to a particular subscriber unit, an intelligent choice may be made as to an optimum beam configuration for providing communication links therewith. However, preferred embodiments of the present invention select an optimum beam configuration as a function of subscriber unit speed in addition to using the above direction and angle spread information. For example, in operation according to a preferred embodiment a particular ARV associated with a subscriber unit moving at a low speed may use a different beam configuration than is used for a same ARV associated with a subscriber unit moving at a high speed. Accordingly, mapping circuitry 150 utilizes the direction and angle spread information from filter 140 as well as speed information from Rayleigh fading estimator circuitry 160 in mapping the measured metrics to an optimized beam configuration selection. For example, mapping circuitry 150 may map averaged direction information, angle spread information, and speed information to an optimum beam index identifying a set of beam forming coefficients (e.g., phase and/or amplitude information for each antenna element or antenna column of the AAA) defining an optimum beam radiation pattern stored in a database coupled to beam correlator 100.

Figure 2:
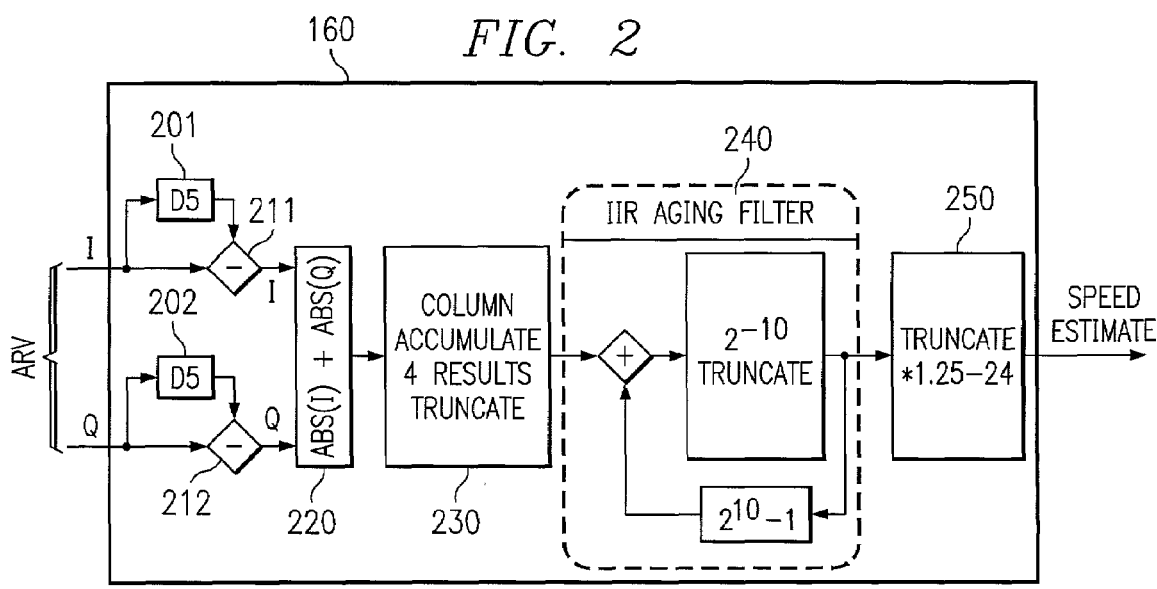
FIG. 2 shows further detail with respect to a preferred embodiment fading rate estimator of the beam correlator of FIG. 1.

Directing attention to FIG. 2, a preferred embodiment implementation of Rayleigh fading estimator circuitry 160 is shown. A purpose of the preferred embodiment fading estimator is to determine how correlated ARV samples for a particular subscriber unit are. Accordingly, the preferred embodiment fading estimator of FIG. 2 is basically is a differentiator or Finite Impulse Response (FIR) differencing filter, operating to subtract an ARV associated with a particular subscriber unit from another ARV associated with that same subscriber unit at a previous point in time.

The illustrated embodiment includes delay elements 201 and 202 providing a 5 ARV sample delay with respect to the real (in-phase) and imaginary (quadrature) portions, respectively, of the complex value of an ARV. Of course, it should be appreciated that there is no limitation to the present invention using a 5 sample delay.

According to the illustrated embodiment, the real part of a delayed ARV is provided by delay element 201 to subtractor 211 along with the real part of a current ARV. Similarly, the imaginary part of the delayed ARV is provided by delay element 202 to subtractor 212 along with the real part of the current ARV. Subtractors 211 and 212 provide a real and imaginary part difference between the current ARV and the delayed ARV.

ARVs of the preferred embodiment are provided in floating point form to facilitate the use thereof, such as calculating the above described differences. For example, an ARV may be represented as a mantissa and an exponent. The mantissa of the preferred embodiment ARV provides normalized ARV information with the exponent providing the magnitude of the ARV. By using floating point representation of the ARV, differences in the subscriber unit's signal power level (magnitude) may be easily ignored in the fading rate determination by simply dropping the exponent portion of the floating point representation. Of course, ARVs utilized according to the present invention may be represented in various other forms, if desired. However, it should be appreciated that particular representations of ARVs may require additional processing power to implement the present invention.

Summer 220 is provided to sum the real and imaginary difference vector parts (absolute value of the result of subtractor 211 summed with the absolute value of the result of subtractor 212) to provide an indication of the subscriber unit's speed. However, as previously discussed, the preferred embodiment beam correlator of the present invention may be coupled to an adaptive array antenna having multiple antenna elements or antenna element columns. As such, the ARVs provided to Rayleigh fading estimator circuitry 160 may include information with respect to multiple antenna elements, such as real (in-phase) and imaginary (quadrature) information with respect to each antenna element or antenna column. Accordingly, Rayleigh fading estimator circuitry 160 preferably includes column accumulator 230 to accumulate and sum the results provided by summer 220 for each antenna column contributing to the ARV for a particular subscriber unit to provide an indication of the subscriber unit's speed.

In operation according to the preferred embodiment, if the difference between the current ARV and the delayed ARV is very large, as indicated by a large result from column accumulator 230, the Rayleigh fading is very fast. It may be concluded that if the Rayleigh fading is very fast, the subscriber unit is moving very fast. Similarly, if the difference between the current ARV and the delayed ARV is very small, as indicated by a small result from column accumulator 230, the Rayleigh fading is very slow. It may be concluded that if the Rayleigh fading is very slow, the subscriber unit is moving very slow.

It should be appreciated that the above described technique for determining a subscriber unit's speed provides only a rough estimate. However, experimentation has determined that this technique provides a reliable enough estimate for use according to the present invention. Of course, the technique may be adapted for use in particular situations, if desired, such as by adjusting the delay associated with the difference calculations depending upon empirical evidence, the type of communication system utilized, the operational behavior of users, etcetera.

In order to provide an estimate of speed which is filtered with respect to spurious or anomalous fading determinations, preferred embodiment Rayleigh fading estimator circuitry 160 includes aging filter 240. Aging filter 240 preferably provides an infinite impulse response (IIR) filter to provide an average over time of the summed ARV element differences provided by column accumulator 230. For example, in operation according to a preferred embodiment, approximately 800 ARV samples per second are provided to Rayleigh fading estimator circuitry 160 resulting in approximately 800 summed ARV element differences provided by column accumulator 230 per second. These samples may be averaged by aging filter 240 over a predetermined period, such as 1 second, to provide a filtered indication of the speed. Of course, averaging mechanisms other than that illustrated may be utilized according to the present invention, if desired.

It should be appreciated that, although the filtered indication of speed provided by aging filter 240 is proportional to the subscriber unit's speed in many cases, it does not measure speed directly. It may be desirable to provide a scaling or other function to provide a speed indicator value from a calculated fading rate. Accordingly, the illustrated embodiment of Rayleigh fading estimator circuitry 160 includes fading rate to speed correlation circuitry 250. Fading rate to speed correlation circuitry preferably provides a speed value output as a function of the fading rate determined by Rayleigh fading estimator circuitry 160. It may be desirable to use such a speed value in order to provide information more readily identifiable with particular operational attributes and/or to provide a system which may be easily implemented in various environments wile requiring a minimum of specific adaptation (such as changing the fading correlation function).

Figure 9:
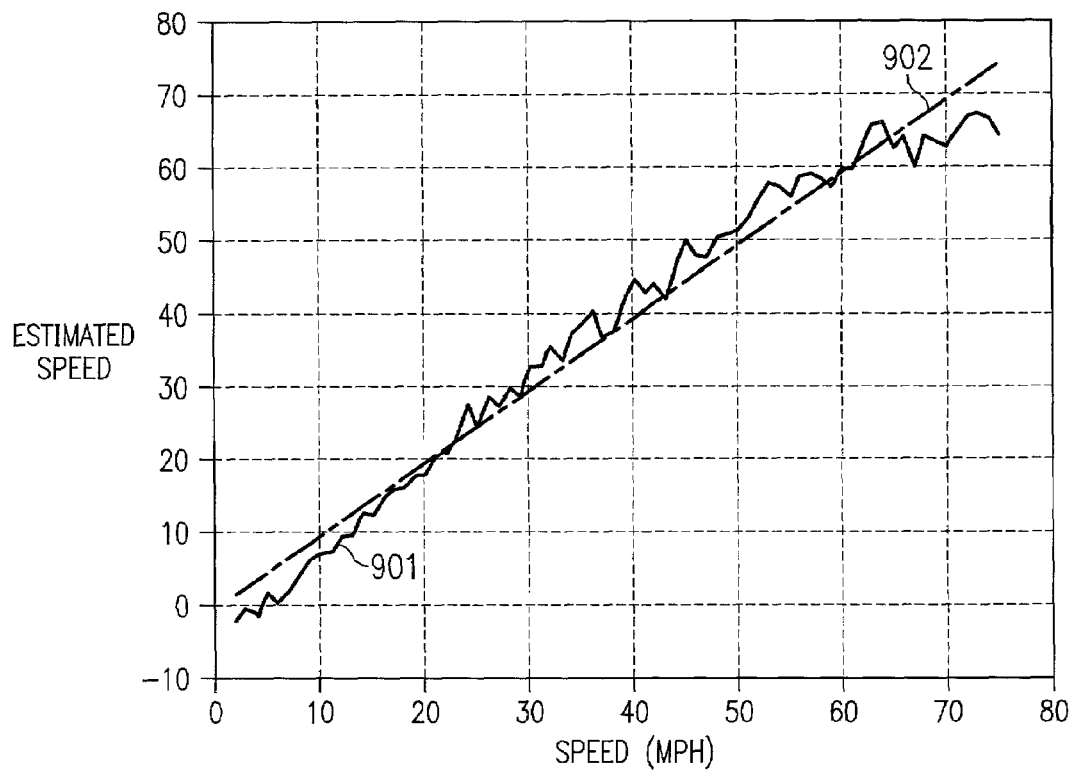
FIG. 9 shows a simulated speed determination based directly upon fading estimates of the present invention.

Preferred embodiments of the fading estimator utilize regressive coefficients to smooth the speed estimates made according to the present invention. Directing attention to FIG. 9, line 902 shows a line, having a slope of 1, representing an ideal 1 to 1 correspondence between the estimated speed (Y axis) and the actual speed (X axis). However, it has been determined that a determination of speed directly based upon fading estimates of the preferred embodiment of the present invention may not provide a line suitably corresponding to ideal line 902. Accordingly, regressive coefficients are preferably utilized to provide a speed estimate according to the present invention having a substantially 1 to 1 correspondence between estimated speeds and actual speeds to provide an estimation which more closely approaches the ideal of line 902. For example, a regressive coefficient may be utilized to rotate a line representing speed estimation determinations to provide a slope approaching 1, as provided by ideal line 902. Similarly, a regressive coefficient may be utilized to shift a line representing speed estimation such that it crosses the X and Y axes at the origin (0,0), as does ideal line 902.

A simulated speed determination based upon fading estimates of the present invention is shown as line 901, wherein regressive coefficients have been utilized to substantially fit the output of aging filter 240 to ideal line 902. Application of a regressive coefficient to a speed determination of the preferred embodiment fading estimator is shown in block 250 wherein the regressive coefficients are 1.25 (used for line rotation) and −24 (used for shifting the line).

Pseudo code for implementing the above described preferred embodiment Rayleigh fading estimator circuit as a computer circuit adapted to operate according to the present invention is provided below.

SET FIR FILTER COEFFICIENTS h=[1 0 0 0 0−1]

FILTOUT=convolve (h, mantissa(ARV))

REL_EST SUM_OVER4_ANTENNAS {|real(FILTOUT)|+ |imag(FILTOUT)|}

AREL_EST=IIR_FILTER ([1024, −1023]/1024, 1, REL_EST)

SPEED=AREL_EST * REG_COEFFICIENT1—REG_COEFFICIENT2

Where, ARV is the Array Response Vector output from the pilot integrator (complex vector), h is the FIR filter coefficients (binary), FILTOUT is the output of the differencing FIR filter (complex), REL_EST is the instantaneous fading rate (speed) estimate (real), AREL_EST is the average fading rate (speed) estimate (real), and REG_COEFFICIENT1 and REG_COEFFICIENT2 are a regressive coefficients. In the preferred embodiment, the FIR filter implements the following equation:

$$y(n)=x(n)-x(n-5)$$

Where y(n) represents the output of the differencing FIR filter and x(n) represents the input to the differencing FIR filter.

Figure 3:
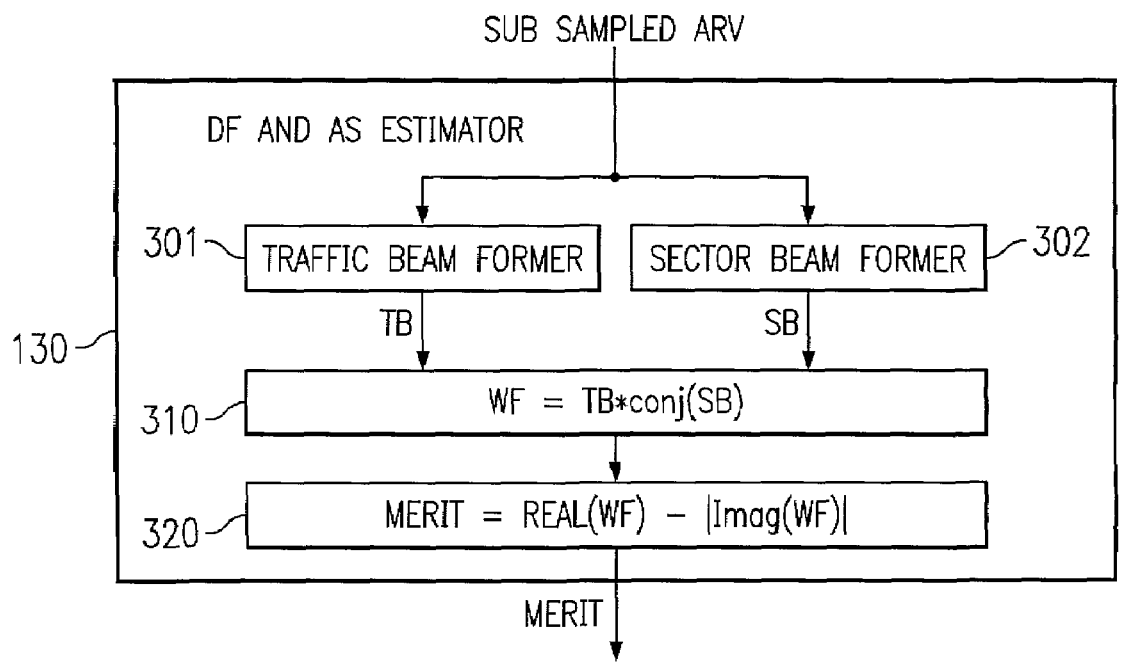
FIG. 3 shows further detail with respect to a preferred embodiment direction finding and angle spread estimator of the beam correlator of FIG. 1.

Directing attention to FIG. 3, a preferred embodiment implementation of direction finding and angle spread circuitry 130 is shown. A purpose of direction finding and angle spread circuitry 130 is to provide beam correlation with respect to a narrow beam configuration (e.g. traffic beam) and a wide beam configuration (e.g. sector beam). For example, a common pilot signal may be provided to subscriber units in a relatively wide sector beam. If traffic signals are provided in a narrow traffic beam, it is likely that the signal spread associated with the particular subscriber unit will cause a phase mismatch between the traffic signal and the pilot signal. Such a phase mismatch may result in the inability to demodulate the traffic signal using the pilot signal or provide a higher than acceptable error rate.

Accordingly, direction finding and angle spread circuitry of the preferred embodiment of the present invention provides correlation between various traffic beam configurations and a sector beam configuration in the reverse link in determining a forward link traffic beam configuration for use with a particular subscriber unit. Specifically, the preferred embodiment direction finding and angle spread circuitry operates to identify a most narrow traffic beam which, when implemented in the forward link, provides a response at the subscriber unit similar to that of using a sector beam to transmit the traffic signal in order to provide an acceptable level of phase matching between the traffic signal transmitted in the traffic beam and a pilot signal transmitted in a sector beam. However, as it has been determined that subscriber unit speed is relevant to the selection of an optimum beam configuration, the preferred embodiment direction finding and angle spread circuitry provides a beam merit result for use with speed information in determining a beam configuration for use according to the present invention.

Preferred embodiment direction finding and angle spread circuitry 130 includes traffic beam former 301 utilized to provide traffic beam formed value complex scalars (TB) from a subscriber unit's ARV. Additionally, preferred embodiment direction finding and angle spread circuitry 130 includes sector beam former 302 utilized to provide sector beam formed value complex scalars (SB) from a subscriber unit's ARV.

It should be appreciated that, according to the preferred embodiment, the ARVs provided to direction finding and angle spread circuitry 130 are sub-sampled as described above with respect to decimator 120. Accordingly, the ARVs described in the preferred embodiment are those which decimator 120 passes to direction finding and angle spread circuitry 130. Of course, alternative embodiments of the invention may provide all ARVs to direction finding and angle spread circuitry 130, if desired.

Preferably traffic beam former 301 utilizes a plurality of traffic beam configurations, e.g., complex antenna element weights to provide antenna beams of a desired direction and/or width, for correlation according to the present invention. For example, traffic beam former 301 may utilize a plurality of antenna beam configurations providing various amounts of antenna gains, such as very narrow, narrow, average, wide, and very wide beamwidths, for each azimuth direction, such as in 1 degree increments, throughout a portion of a service area, such as a sector. Accordingly, a 120° sector may have 600 (5*120) traffic beam configurations associated therewith.

However, such a large number of traffic beams may require substantial processing power and/or time for correlation according to the present invention. Accordingly, a preferred embodiment of the present invention may utilize fewer traffic beam configurations, such as 255 traffic beams where 5 beam configurations are provided at approximately 2.35° intervals through a 120° sector. It should be appreciated that such an embodiment may provide a total of 256 beam configurations, 255 traffic beams and 1 sector beam. Of course, the present invention is not limited to any particular number of beam configurations and, therefore, alternative embodiments of the invention may use more or less beam configurations depending upon the resolution desired and the amount of processing power available.

In operation according to a preferred embodiment, traffic beam former 301 computes an inner product of each traffic beam configuration (vector) with the ARV to beam form all of the traffic beams in the traffic beam database and provide the traffic beam complex scalar (TB) for each such traffic beam. Similarly, sector beam former 302 computes an inner product of the sector beam configuration (vector) with the ARV to beam form the sector beam and provide the sector beam complex scalar (SB).

For example, where the ARV is provided by 4 antenna element columns, the 4 complex values associated with each of the 4 antenna element columns provided by pilot integrator 110 as the ARV for a particular subscriber unit are preferably multiplied with a complex beam weight associated with each traffic beam configuration by traffic beam former 301. The product for each antenna element column of the ARV is then preferably summed to provide a traffic beam complex scalar for each traffic beam configuration. Similarly, the 4 complex values associated with each of the 4 antenna element columns provided by pilot integrator 110 as the ARV for the particular subscriber unit are preferably multiplied with a complex beam weight associated with a sector beam configuration by sector beam former 302. The product for each antenna element column of the ARV is then preferably summed to provide a sector beam complex scalar.

According to the preferred embodiment, direction finding and angle spread circuit 130 determines a weight function (WF) for each traffic beam. The illustrated embodiment determines a beam's weight function by multiplying the traffic beam complex scalar (TB) by the complex conjugate of the sector beam complex scalar (SB).

Preferably a merit value (Merit) is determined with respect to each traffic beam by subtracting the absolute value of the imaginary part of the weight function from the value of the real part of the weight function. The preferred embodiment merit value determination is based upon determining a highest level of confidence in demodulation decisions.

For example, a quaternary phase-shift keying (QPSK) signal is a complex signal having a real (in-phase) part and an imaginary (quadrature) part. The decision boundary defining a level of signal distortion which may be tolerated and still allow a correct decision to be made in demodulating a QPSK signal may be represented graphically. Decision boundary 401 of FIG. 4 illustrates the QPSK decision boundary which, if a signal is so distorted that it crosses this boundary, an incorrect demodulation decision will be made.

Figure 4:
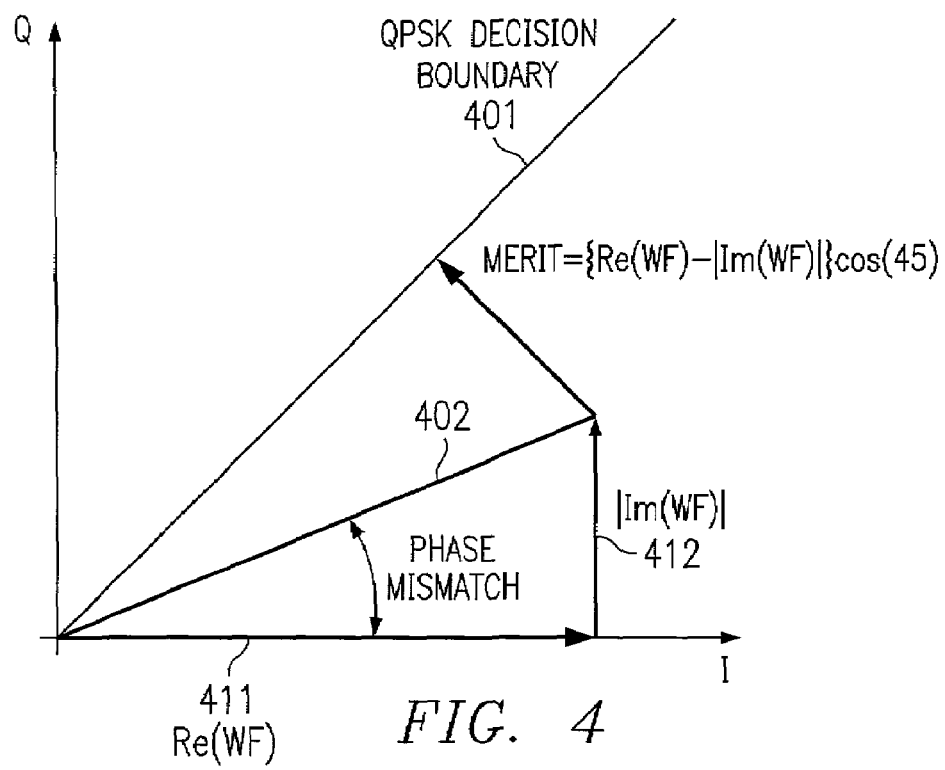
FIG. 4 shows a graph illustrating a decision boundary for correctly demodulating a received signal.

Received signal 402, having a real (in-phase) part and an imaginary (quadrature) part, is also shown in FIG. 4. The real part of the received signal (vector 411) and the absolute value of the imaginary part of received signal (vector 412) establish the amount of phase mismatch experienced with respect to the received signal and a corresponding demodulation signal and, therefore, represents distortion experienced in demodulating a received signal. At the point received signal 402 reaches decision boundary 401, and all points above, correct demodulation decisions will not be made.

Accordingly, the merit function of the preferred embodiment indicates a relationship between a received signal and the appropriate decision boundary to provide a level of merit associated with the particular beam used for the received signal. For example, using trigonometry, the shortest distance from the end point of received signal 402 to decision boundary 401 is given by real part 411 minus the absolute value of the imaginary part 412, times the cosine of 45°. Accordingly, the preferred embodiment merit function represents the distance that a received signal, beam formed using a particular beam, is from a demodulation mistake boundary. However, it should be appreciated that since the cosine of 45° is a constant that portion of the equation may be ignored according to the preferred embodiment merit function.

In operation according to a preferred embodiment, the merit function provides information for choosing a beam configuration which gives the greatest distance from the decision boundary. Such a beam provides the highest confidence with respect to signal demodulation.

Figure 5:
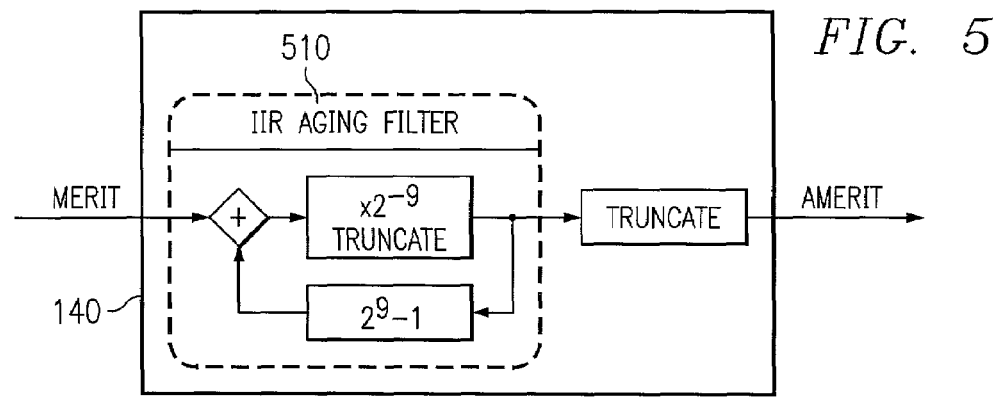
FIG. 5 shows further detail with respect to a preferred embodiment aging filter of the beam correlator of FIG. 1.

Directing attention to FIG. 5, a preferred embodiment implementation of aging filter 140 is shown. A purpose in providing aging filter 140 is to provide a merit value for each beam configuration which is filtered with respect to spurious or anomalous merit function determinations. Accordingly, aging filter 140 preferably provides IIR filter 510 to provide an average over time of the merit values (AMerit) for each beam configuration provided by direction finding and angle spread circuitry 130. These merit values may be averaged by aging filter 140 over a predetermined period, such as 1 second, to provide a filtered indication of the merit of each traffic beam. Of course, averaging mechanisms other than that illustrated may be utilized according to the present invention, if desired.

Pseudo code for implementing the above described preferred embodiment direction finding and angle spread circuit and aging filter as a computer circuit adapted to operate according to the present invention is provided below.

| | |
|---|---|
| Form Traffic Beams | TB = conj_transpose (ARV) * Wt |
| Form Sector Beam | SB = conj_transpose (ARV) * Wp |
| Form Weight Function | WF = TB * conj (SB) |
| Calculate Merit | Merit = real (WF) − \|imag (WF)\| |
| Calculate Average Merit | AMerit = IIR_filter (Merit) |

Where, ARV is the speed compensated Array Response Vector output from the decimator (complex vector), TB is the traffic beam formed value (complex vector), SB is the sector beam formed value (complex vector), Wp is the normalized (meaning norm(Wp)=1) pilot beam former weights (complex vector), Wt is are the normalized traffic beam former weights including the pilot beam former weights (complex vector), Merit being the output of the direction finding and angle spread circuitry (real vector), and AMerit being the average merit output from the aging filter (real vector). In the preferred embodiment, the IIR filter implements the following equation:

$$y(n)=\rho[x(n)y(n-1)]+y(n-1)$$

Where $\rho=2^{-9}$, y(n) represents the output of the IIR filter (AMerit), and x(n) represents the input to the IIR filter (Merit).

The beam configuration providing the highest average merit value (highest AMerit value) has the highest gain and the least phase mismatch with respect to the sector beam and, therefore, may be selected as a preferred beam for use in providing a link to the subscriber unit. However, the preferred embodiment of the present invention does not only rely upon beam correlation, but also utilizes subscriber unit speed information in selecting an optimum beam configuration. Accordingly, beam mapping circuitry 150 is preferably used to map the average merit values for each beam configuration to a speed corrected average merit value. For example, beam mapping circuitry 150 may provide a particular weight by which each beam's average merit value may be multiplied, depending upon the subscriber unit's estimated speed.

For example, each traffic beam in the preferred embodiment database may have a set of weights (Wm), such as four different weights each corresponding to a different range of subscriber unit speeds. Accordingly, a calculated average merit value (AMerit) for each beam may be multiplied by the appropriate weight value (Wm), as indicated by the subscriber unit's estimated speed, to provide a speed weighted merit value for selection of an optimum beam configuration. Preferably, the beam configuration having the highest speed weighted merit value is selected as an optimum beam configuration according to the present invention.

Preferred embodiments of the present invention operate to select optimized beam configurations to minimize transmit power while maintaining a desired level of signal quality. Accordingly, the above mentioned weights corresponding to subscriber unit speeds may be determined based upon simulations and/or empirical evidence with respect to antenna beam configurations having a minimum transmit power while maintaining a threshold signal quality.

Directing attention to FIGS. 6A–6F, graphical representations of simulation results with respect to various subscriber directions (AOA), subscriber speeds, and spread angles for different simulated beam configurations are shown. Specifically, the FIGS. 6A–6F show simulated results for each of 4 angle spreads, where the Y-axis represents transmit power and the X-axis represents beam configurations 1–6 (where beam configuration 1 corresponds to the sector beam configuration and beam configurations 2–6 correspond to progressively more narrow beams with beam configuration 6 being the most narrow). The angle spreads represented in the figures are progressively wider and wider. For example, in each of FIGS. 6A–6F line A may represent an angle spread of 2°, line B may represent an angle spread of 6°, line C may represent an angle spread of 10°, and line D may represent an angle spread of 22°.

Figure 6A:
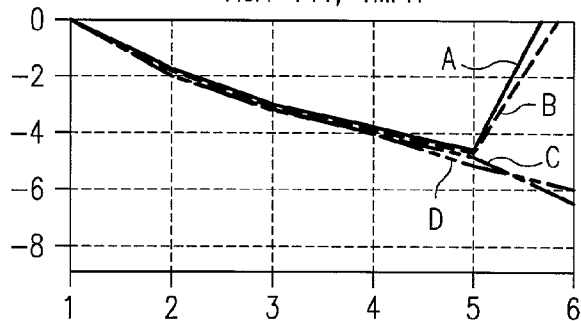
FIGS. 6A–6F show graphical representations of simulation results with respect to various subscriber directions, subscriber speeds, and spread angles for different simulated beam configurations.
Figure 6B:
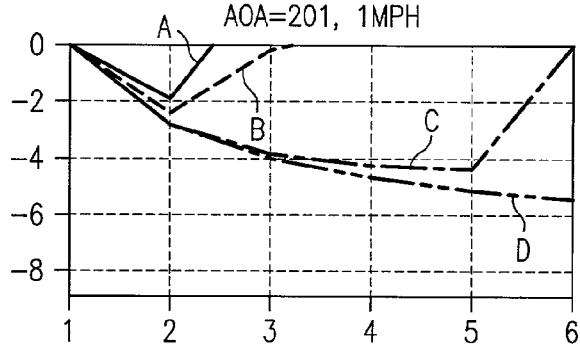
Figure 6C:
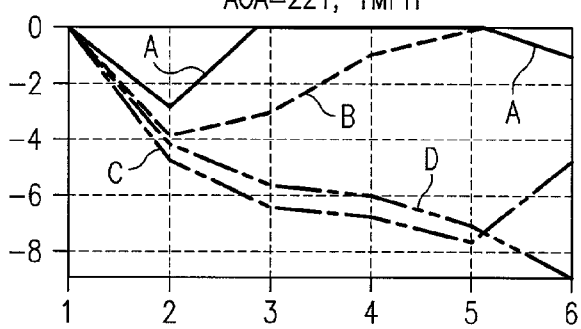
Figure 6D:
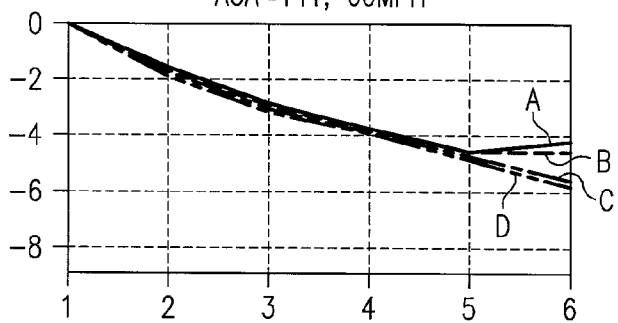
Figure 6E:
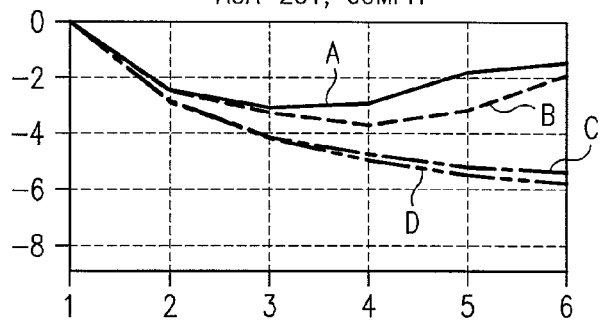
Figure 6F:
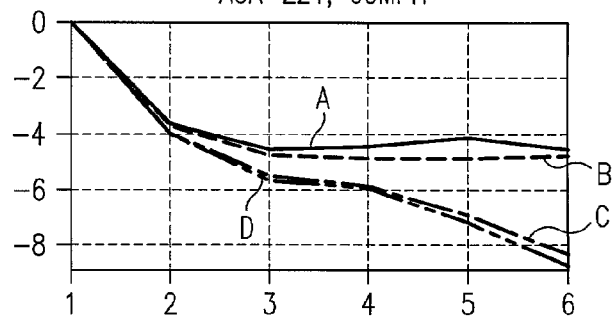

FIG. 6A shows simulated results for 4 angle spreads for a subscriber unit disposed at an angle of 141° with respect to the BTS and having an estimated speed of 1 MPH. FIG. 6B shows simulated results for 4 angle spreads for a subscriber unit disposed at an angle of 201° with respect to the BTS and having an estimated speed of 1 MPH. FIG. 6C shows simulated results for 4 angle spreads for a subscriber unit disposed at an angle of 221° with respect to the BTS and having an estimated speed of 1 MPH. FIG. 6D shows simulated results for 4 angle spreads for a subscriber unit disposed at an angle of 141° with respect to the BTS and having an estimated speed of 60 MPH. FIG. 6E shows simulated results for 4 angle spreads for a subscriber unit disposed at an angle of 201° with respect to the BTS and having an estimated speed of 60 MPH. FIG. 6F shows simulated results for 4 angle spreads for a subscriber unit disposed at an angle of 221° with respect to the BTS and having an estimated speed of 60 MPH.

Comparing the graphs for a same angle spread and direction but different speed, i.e., comparing the graphs of FIG. 6A with FIG. 6D, FIG. 6B with FIG. 6E, and FIG. 6C with FIG. 6F, it can readily be appreciated that a beam configuration resulting in a lowest transmit power at a low speed is not always the same beam configuration resulting in a lowest transmit power at a high speed. For example, for the angle spread conditions associated with line B, when the subscriber unit is disposed at an angle 201° with respect to the BTS, beam configuration 2 provides for the least transmit power when the subscriber unit's speed is 1 MPH (FIG. 6B). However, for the angle spread conditions associated with line B, when the subscriber unit is disposed at an angle 201° with respect to the BTS, beam configuration 4 provides the least transmit power when the subscriber unit's speed is 60 MPH (FIG. 6E).

Accordingly, the preferred embodiment of the present invention uses this information to provide predetermined weighting for use by beam mapping circuitry 150. Specifically, a preferred embodiment of the present invention utilizes beam performance information, such as that provided by the synthesized results of FIGS. 6A–6F, to assign a weighting for various speed ranges to each beam configuration. The weighting may be selected as a function of the performance of the beam configuration at the particular speed, such as the amount of transmit power reduction over that associated with the use of a sector beam (as may be read from the graphs of FIGS. 6A–6F). For example, weighting may be provided for each beam configuration at each angle the beam configuration may be operated. Additionally or alternatively, the weighting may be provided for each of a plurality of angle spread ranges which may be experienced with a particular beam configuration and/or the angles at which the beam configuration may be operated. Moreover, it should be appreciated that beam configuration weight values used according to the present invention may be updated continuously or periodically, such as using empirical information provided through operation of the present invention.

Exemplary calculated weights (Wm) for 25 different beam configurations (5°, 11°, 21°, 31°, and 41° beam widths at directions 141°, 161°, 181°, 201°, and 221°) with various subscriber unit speeds (1 MPH, 5 MPH, 10 MPH, 20 MPH, 30 MPH, 40 MPH, 50 MPH, 60 MPH, and 75 MPH) are shown in the table below.

| Beam Configuration (direction & width) | 1 MPH | 5 MPH | 10 MPH | 20 MPH | 30 MPH | 40 MPH | 50 MPH | 60 MPH | 75 MPH |
|---|---|---|---|---|---|---|---|---|---|
| 141(41) | 1 | 1.3055 | 1 | 1 | 1 | 1 | 1 | 1 | 1 |
| 141(31) | 1 | 1.0942 | 1 | 1 | 1 | 1 | 1 | 1 | 1 |
| 141(21) | 1 | 1 | 1 | 1 | 1 | 1 | 1 | 1 | 1.0653 |
| 141(11) | 1.0885 | 1.0885 | 1.0885 | 1.0885 | 1.0885 | 1.0885 | 1.0744 | 1.0744 | 1.0593 |
| 141(5) | 1 | 1 | 1 | 1 | 1 | 1 | 1 | 1 | 1 |
| 161(41) | 1 | 1.2594 | 1 | 1 | 1 | 1 | 1 | 1 | 1 |
| 161(31) | 1 | 1 | 1 | 1 | 1 | 1 | 1 | 1 | 1 |
| 161(21) | 1 | 1 | 1 | 1 | 1 | 1 | 1 | 1 | 1 |
| 161(11) | 1.4457 | 1 | 1.4457 | 1.4457 | 1.4457 | 1.4457 | 1.4457 | 1.4296 | 1 |
| 161(5) | 1 | 1 | 1 | 1 | 1 | 1 | 1 | 1 | 1 |
| 181(41) | 1 | 1.209 | 1.2166 | 1 | 1 | 1 | 1 | 1 | 1 |
| 181(31) | 1.0962 | 1.1075 | 1.1075 | 1.1106 | 1.0879 | 1.0962 | 1.1075 | 1.0962 | 1.0549 |
| 181(21) | 1 | 1.0181 | 1.0181 | 1.0211 | 1 | 1 | 1.0181 | 1 | 1.0211 |
| 181(11) | 1.0083 | 1 | 1 | 1.0083 | 1 | 1.0083 | 1 | 1.0083 | 1.0083 |
| 181(5) | 1 | 1 | 1 | 1 | 1 | 1 | 1 | 1 | 1 |
| 201(41) | 1.3328 | 1.3306 | 1 | 1 | 1 | 1 | 1 | 1 | 1 |
| 201(31) | 1 | 1.1851 | 1.1751 | 1.1423 | 1.1407 | 1.1407 | 1.1407 | 1.1407 | 1.139 |
| 201(21) | 1 | 1.1035 | 1 | 1 | 1.0696 | 1.0696 | 1.0696 | 1.0696 | 1.0925 |
| 201(11) | 1.054 | 1 | 1.054 | 1 | 1 | 1 | 1 | 1 | 1.054 |
| 201(5) | 1 | 1 | 1 | 1 | 1 | 1 | 1 | 1 | 1 |
| 221(41) | 1.6337 | 1 | 1 | 1 | 1 | 1 | 1 | 1 | 1 |
| 221(31) | 1 | 1.3905 | 1 | 1 | 1 | 1 | 1 | 1.3477 | 1 |
| 221(21) | 1 | 1 | 1 | 1 | 1 | 1 | 1 | 1.3043 | 1.2276 |
| 221(11) | 1.2034 | 1.2034 | 1.2034 | 1 | 1 | 1 | 1 | 1 | 1.1356 |
| 221(5) | 1 | 1 | 1 | 1 | 1 | 1 | 1 | 1 | 1 |

It should be appreciated that the exemplary calculated weighting values shown above suggest that at least 2 decimal points of accuracy are preferred according to this embodiment.

Using predetermined weights, such as those shown above, preferred embodiment beam mapping circuitry 150 determines an optimum beam index as a function of the average merit (AMerit) value for each beam configuration. Preferably, beam mapping circuitry 150 multiples the average merit (AMerit) value for each beam configuration, as provided by aging filter 140, by a corresponding weight value associated with that particular beam configuration and the subscriber unit's estimated speed, as provided by Rayleigh fading estimator circuitry 160. The optimum beam index is preferably selected as the beam configuration index corresponding to the highest weighted average merit value as calculated by beam mapping circuitry 150.

The optimum beam index provided by beam mapping circuitry 150 preferably identifies the beam configuration parameters corresponding to the desired beam configuration as stored in a beam configuration parameter database coupled to beam correlator 100. Using the optimum beam index, the database may be accessed, the optimum beam configuration parameters retrieved, and an optimum beam formed in the forward link by using the retrieved parameters on a transmit signal as it is provided to antenna columns of the adaptive array antenna.

Figure 7:
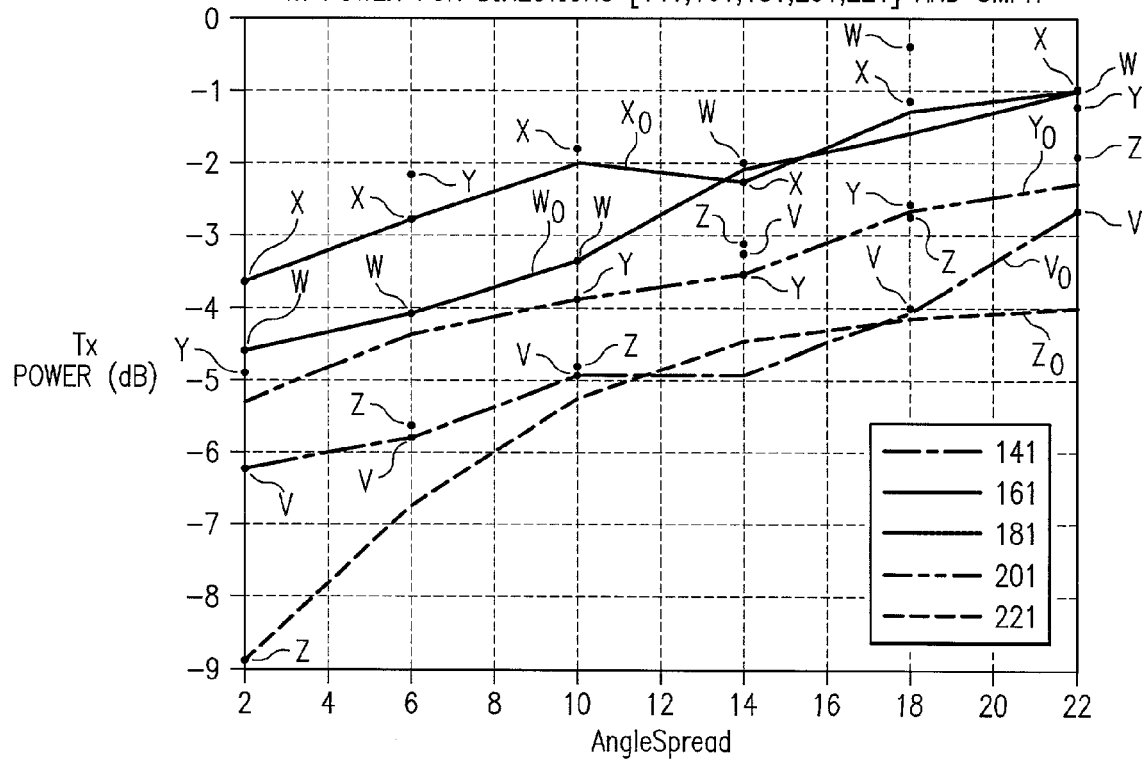
FIGS. 7 and 8 show graphs representing simulated operation of a preferred embodiment beam correlator of the present invention.
Figure 8:
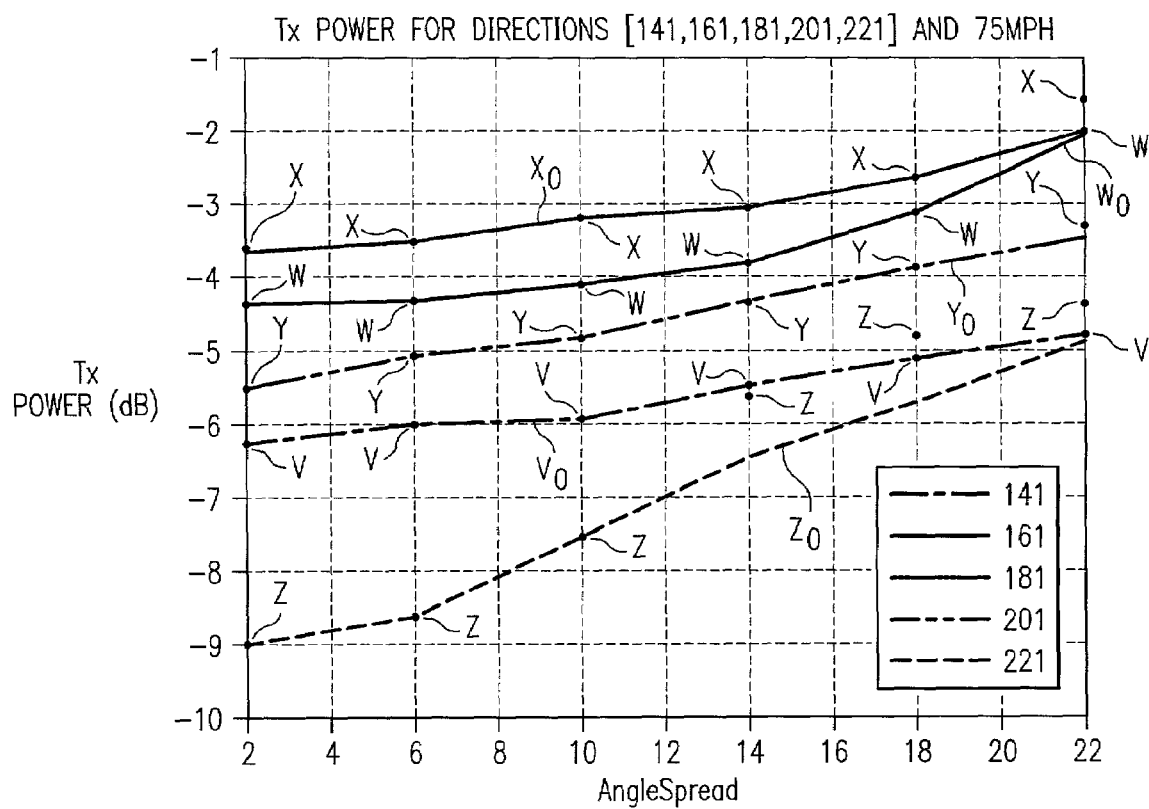

Graphs representing simulated operation of a preferred embodiment beam correlator of the present invention are shown in FIGS. 7 and 8, where FIG. 7 simulates operation with respect to a subscriber speed of 5 MPH and FIG. 8 simulates operation with respect to a subscriber speed of 75 MPH. Specifically, FIGS. 7 and 8 show lines ($V_O$, $W_O$, $X_O$, $Y_O$, and $Z_O$) representing the theoretical optimum transmit power level when using an optimum beam configuration at various directions (141°, 161°, 181°, 201°, and 221°, respectively) with different angle spreads (2°, 6°, 10°, 14°, 18°, and 22°). Additionally, FIGS. 7 and 8 show simulated operational points (V, W, X, Y, and Z) representing the simulated transmit power of beam configurations selected according to the present invention at various directions (141°, 161°, 181°, 201°, and 221°, respectively) with different angle spreads (2°, 6°, 10°, 14°, 18°, and 22°).

The theoretical optimal transmit power level lines $V_O$, $W_O$, $X_O$, $Y_O$, and $Z_O$ represent the minimum transmit power it will theoretically take to maintain a certain signal quality using the optimum one of the beam configurations. The simulated operational points V, W, X, Y, and Z show the transmit power it will take to maintain the signal quality using the beam configuration selected according to a preferred embodiment of the present invention. Where operation of the present invention selects a beam configuration suitable for maintaining the signal quality with a transmit power matching that of the theoretical optimum transmit power level, the simulated point falls upon the theoretical line. It should be appreciated that the simulation results of FIGS. 7 and 8 show that operation of the present invention meets or very closely approaches the theoretical transmit power levels a majority of the time.

Moreover, it should be appreciated that these simulations show that operation of the present invention consistently provides a decrease in transmit power over that of transmission within a sector beam (0 dB). Accordingly, one way to evaluate the performance of the beam correlator of the present invention is to quantize the Average Transmit power Gain (APG), relative to the sector beam power, over the directions and angle spreads.

Although preferred embodiments have been described herein with respect to the use of optimized antenna beams of the present invention in forward link communications, it should be appreciated that the present invention is not so limited. Accordingly, optimized beams of the present invention may be utilized in the forward link, reverse link, and combinations thereof.

Although the present invention and its advantages have been described in detail, it should be understood that various changes, substitutions and alterations can be made herein without departing from the spirit and scope of the invention as defined by the appended claims. For example, although the present invention has been described with respect to calibration in a forward link (central system to subscriber premises), it should be appreciated that reverse link calibration (subscriber premises to central system) and/or pier to pier link calibration (central system to central system or subscriber premises to subscriber premises) calibration may be provided according to the present invention. Accordingly, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or late to be developed that perform substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for selecting a beam configuration for use in a communication link, said system comprising:
   a speed estimator providing speed information with respect to a subscriber unit using corresponding array response vector information determined from a reverse link; and
   a beam selector providing selection of a beam configuration for use in a communication link with respect to said subscriber unit from a plurality of beam configurations using said speed information, and
   a beam configuration analyzer providing beam merit information for a plurality of beam configurations with respect to said subscriber unit, wherein said beam configuration analyzer uses said array response vector information in providing said beam merit information, wherein said beam merit information is weighted by said beam selector using said speed information for selection of said beam configuration.

2. The system of claim 1, further comprising:
   a signal integrator providing said array response vector information.

3. The system of claim 2, wherein said array response vector information includes a plurality of array response vectors each of which represents a path from a particular subscriber unit to said communication link.

4. The system of claim 3, wherein said signal integrator integrates a unique pilot signal of said subscriber unit to provide an array response vector of said array response vector information.

5. The system of claim 3, wherein said signal integration circuitry integrates a uniquely coded signal of said subscriber unit to provide an array response vector of said array response vector information.

6. The system of claim 1, further comprising:
   a decimator providing controlled decimation of said array response vector information prior to analysis by said beam configuration analyzer, wherein said decimation is controlled as a function of said speed information.

7. The system of claim 1, wherein said beam merit information comprises a correlation between a first beam formed value and a reference beam formed value, wherein said first beam formed value is determined using a relatively narrow beam configuration and a first array response vector of said array response vector information and said reference beam formed value is determined using reference beam configuration and said first array response vector.

8. The system of claim 7, wherein said reference beam configuration is a sector beam configuration.

9. The system of claim 1, wherein said speed estimator determines said speed information as a function of a fading estimate.

10. The system of claim 9, wherein said fading estimate is determined using a difference between a first array response vector of said array response vector information and a second array response vector of said array response vector information.

11. The system of claim 9, wherein said first array response vector and said second array response vector are associated with said subscriber unit at different points in time.

12. The system of claim 1, wherein said communication link comprises a forward link.

13. The system of claim 1, wherein said communication link comprises a reverse link.

14. A system for selecting an optimum wireless link beam configuration, said system comprising:
   speed estimation circuitry providing speed information with respect to a subscriber unit, wherein said speed information is determined by said speed estimation circuitry using array response vector information of a signal from said subscriber unit as received by an antenna array;
   beam analyzer circuitry providing beam merit information with respect to said subscriber unit for a plurality of beam configurations, wherein said beam merit information is determined by said beam analyzer circuitry using said array response vector information; and
   beam mapping circuitry providing selection of an optimum beam with respect to said subscriber unit using said beam merit information and said speed information.

15. The system of claim 14, further comprising:
   signal integration circuitry providing said array response vector information.

16. The system of claim 15, wherein said signal integration circuitry integrates a unique pilot signal of said subscriber unit to provide an array response vector of said array response vector information.

17. The system of claim 15, wherein said signal integration circuitry integrates a uniquely coded signal of said subscriber unit to provide an array response vector of said array response vector information.

18. The system of claim 14, wherein said speed information is derived from signal fading estimation.

19. The system of claim 18, wherein said speed estimation circuitry comprises:
   differentiator circuitry determining difference information with respect to a first array response vector associated with said subscriber unit at a first time and a second array response vector associated with said subscriber unit at a second time, wherein said array response vector information includes said first array response vector and said second array response vector.

20. The system of claim 19, wherein said first time and said second time are separated by at least 5 array response vector sampling epochs.

21. The system of claim 20, wherein said sampling epochs are approximately 800 ms.

22. The system of claim 14, wherein said speed estimation circuitry comprises:
an aging filter providing an estimation over time of speed estimation values.

23. The system of claim 14, wherein said speed estimation circuitry comprises:
a regressive coefficient multiplier providing correction of speed estimation values with respect to actual speed values.

24. The system of claim 14, further comprising:
array response vector decimation circuitry, wherein said array response vector information is decimated by said array response vector decimation circuitry prior to use by said beam analyzer circuitry.

25. The system of claim 24, wherein decimated array response vector information comprises array response vector information having a sub-sampling rate.

26. The system of claim 24, wherein a decimation rate of said array response vector decimation circuitry is selected as a function of said speed information.

27. The system of claim 14, wherein said beam analyzer circuitry comprises:
narrow beam forming circuitry providing a plurality of narrow beam formed outputs with respect to said array response vector information, said plurality of beam formed outputs corresponding to narrow beam configurations of said plurality of beam configurations having varying, relatively narrow, beam widths;
reference beam forming circuitry providing a reference beam formed output with respect to said array response vector information, said reference beam formed output corresponding to a reference beam configuration of said plurality of beam configurations having a reference beam width; and
beam correlation calculating circuitry providing correlation calculation for each said plurality of narrow beam formed outputs with respect to said reference beam formed output.

28. The system of claim 27, wherein said reference beam configuration corresponds to a sector beam.

29. The system of claim 27, wherein said correlation calculation comprises a particular narrow beam formed output multiplied with a conjugate of said reference beam formed output.

30. The system of claim 14, wherein said beam mapping circuitry includes weighting information associated with beam configurations of said plurality of beam configurations for weighting corresponding beam merit information for selection of said optimum beam.

31. The system of claim 30, wherein said weighting information is a function of speed, and wherein said speed information is used in selecting appropriate weighting information.

32. A method for selecting an optimum wireless link beam configuration, said method comprising:
estimating subscriber unit speed to thereby provide speed information, wherein said speed information is estimated using array response vector information of a signal from said subscriber unit as received by an antenna array;
analyzing a plurality of beam configurations with respect to said subscriber unit to thereby provide beam merit information, wherein said beam merit information is analyzed using said array response vector information; and
mapping said beam merit information to a selected optimum beam configuration as a function of said speed information.

33. The method of claim 32, further comprising:
integrating said signal from said subscriber unit to provide said array response vector information.

34. The method of claim 33, wherein said signal integrated comprises a unique pilot signal of said subscriber unit.

35. The method of claim 33, wherein said signal integrated comprises a uniquely coded signal of said subscriber unit.

36. The method of claim 32, wherein said estimating subscriber speed comprises:
estimating a fading rate associated with said subscriber unit.

37. The method of claim 36, wherein said estimating a fading rate comprises:
determining a difference between a first array response vector associated with said subscriber unit at a first time and a second array response vector associated with said subscriber unit at a second time, wherein said array response vector information includes said first array response vector and said second array response vector.

38. The method of claim 32, wherein said estimating subscriber speed comprises:
providing an estimation over time of speed estimation values.

39. The method of claim 32, further comprising:
decimating said array response vector information prior to said analyzing said plurality of beam configurations.

40. The method of claim 39, wherein said decimating comprises:
selecting a decimation rate as a function of said speed information.

41. The method of claim 32, wherein said analyzing said plurality of beam configurations comprises:
forming a plurality of narrow beam formed outputs with respect to said array response vector information, said plurality of beam formed outputs corresponding to narrow beam configurations of said plurality of beam configurations having varying, relatively narrow, beam widths;
forming a reference beam formed output with respect to said array response vector information, said reference beam formed output corresponding to a reference calculating a correlation between each said plurality of narrow beam formed outputs with respect to said reference beam formed output.

42. The method of claim 41, wherein said correlation calculation comprises a particular narrow beam formed output multiplied with a conjugate of said reference beam formed output.

43. A system for selecting an optimum wireless link beam configuration, said system comprising:
a signal integrator providing array response vector information with respect to a subscriber unit;
a speed estimator coupled to said signal integrator and providing speed information with respect to said subscriber unit using said array response vector information;

a beam configuration analyzer coupled to said signal integrator and providing beam merit information for a plurality of beam configurations with respect to said subscriber unit using said array response vector information; and a beam configuration selector coupled to said speed estimator and said beam configuration analyzer providing selection of an optimum beam with respect to said subscriber unit using said speed information and said merit information.

44. The system of claim 43, further comprising:

a decimator coupled between said signal integrator and said beam configuration analyzer, wherein said decimator decimates said array response vector information for use by said beam configuration analyzer, wherein a rate of said decimation is a function of said speed information.

* * * * *